US008383204B2

(12) United States Patent
Zhu et al.

(10) Patent No.: US 8,383,204 B2
(45) Date of Patent: Feb. 26, 2013

(54) SILOXANE OLIGOMER TREATMENT FOR METALS

(75) Inventors: Danqing Zhu, Mason, OH (US); William J. Van Ooij, Fairfield, OH (US)

(73) Assignee: Ecosil Technologies, LLC, Fairfield, OH (US)

( * ) Notice: Subject to any disclaimer, the term of this patent is extended or adjusted under 35 U.S.C. 154(b) by 28 days.

(21) Appl. No.: 11/938,897

(22) Filed: Nov. 13, 2007

(65) Prior Publication Data

US 2008/0118646 A1    May 22, 2008

Related U.S. Application Data

(60) Provisional application No. 60/866,301, filed on Nov. 17, 2006.

(51) Int. Cl.
    *B05D 3/02* (2006.01)
(52) U.S. Cl. ............... 427/387; 427/384; 427/385.5; 427/388.1
(58) Field of Classification Search .............. 427/387, 427/384, 385.5, 388.1
    See application file for complete search history.

(56) References Cited

U.S. PATENT DOCUMENTS

| | | | |
|---|---|---|---|
| 3,934,334 A * | 1/1976 | Hanni | 29/846 |
| 5,108,793 A | 4/1992 | van Ooij et al. | |
| 5,292,549 A * | 3/1994 | van Ooij et al. | 427/156 |
| 5,753,316 A * | 5/1998 | Brent et al. | 427/486 |
| 5,759,629 A | 6/1998 | van Ooij et al. | |
| 5,942,638 A | 8/1999 | Lichtenhan et al. | |
| 6,416,869 B1 | 7/2002 | van Ooij et al. | |
| 6,756,079 B2 | 6/2004 | van Ooij et al. | |
| 6,919,469 B2 | 7/2005 | van Ooij et al. | |
| 6,927,270 B2 | 8/2005 | Lichtenhan et al. | |
| 7,053,167 B2 | 5/2006 | Ito et al. | |
| 2003/0113523 A1* | 6/2003 | Landi et al. | 428/209 |
| 2003/0185990 A1* | 10/2003 | Bittner et al. | 427/385.5 |
| 2005/0058843 A1 | 3/2005 | van Ooij et al. | |
| 2006/0093755 A1 | 5/2006 | Bittner et al. | |
| 2008/0026151 A1 | 1/2008 | Zhu et al. | |

FOREIGN PATENT DOCUMENTS

| | | |
|---|---|---|
| EP | 1223149 A1 * | 7/2002 |
| JP | 06-192778 * | 7/1994 |
| WO | 2004009717 A1 | 1/2004 |

OTHER PUBLICATIONS

Sigma-Aldrich Fine Chemicals, "Silsesquioxanes", ChemFiles, 2001, vol. 1, No. 6, Aldrich, St.Louis, USA.
Sigma-Aldrich, "Polyhedral Oligomeric Silsesquioxanes (POSS) Nanohybrids: Properties and Processing Methods", AZoJono—Journal of Nantechnology Online, 2007, USA.
Xi Zhang, et al., "Simulations of Organic-tethered Silsesquioxane Nanocube Assemblies", Mater. Res. Soc. Symp. Proc., 2005, vol. 847, Materials Research Society, USA.
International Search Report and Written Opinion, PCT/US07/84889, filed Nov. 16, 2007, University of Cincinnati.

* cited by examiner

*Primary Examiner* — Robert S Walters, Jr.
(74) *Attorney, Agent, or Firm* — Wood Herron & Evans, LLP

(57) ABSTRACT

A method of applying to a clean metal surface an aqueous solution comprised of a small percentage of organofunctional siloxane oligomers. The organofunctional siloxane oligomers used in this method include silsesquioxanes. The organofunctional siloxane oligomers are applied to a metal surface prior to the application of a topcoat and function to inhibit corrosion of the metal surface.

1 Claim, No Drawings

SILOXANE OLIGOMER TREATMENT FOR METALS

RELATED APPLICATIONS

This application claims the benefit of U.S. Provisional Application No. 60/866,301, filed on Nov. 17, 2006, the disclosure of which is hereby incorporated herein in its entirety.

BACKGROUND OF THE INVENTION

Unprotected metal surfaces can suffer severe corrosion when exposed to the environment. To protect metal surfaces from corrosion, the surfaces are often treated with various corrosion inhibitors, such as zirconium or chromium compounds, as well as phosphates such as iron phosphate and zinc phosphate. Each of these corrosion inhibitors has disadvantages such as inadequate protection of the metal surface from the environment, expense, toxicity, and not being environmentally friendly. There is a need for a corrosion inhibitor that offers greater protection than the currently available corrosion inhibitors.

SUMMARY OF THE INVENTION

The present invention is premised on the realization that organofunctional siloxane oligomers applied to metal surfaces function as more effective corrosion inhibitors than the inhibitors currently available on the market. In particular, an aqueous solution containing a small percentage of organofunctional siloxane oligomers is particularly effective as anticorrosion treatments for metal surfaces. The organofunctional siloxane oligomer is applied to a clean metal surface and allowed to dry. Then, optionally, a topcoat may be applied onto the organofunctional siloxane oligomer treated metal surface.

The siloxane oligomers can be used in combination with other mono- and bis-functional silanes to further enhance corrosion protection.

The objects and advantages of the present invention will be further appreciated in light of the following detailed description.

DETAILED DESCRIPTION

The coating composition utilized in the present invention is an aqueous-based coating composition that includes an organofunctional siloxane oligomer.

Organofunctional siloxane oligomers for use in the present invention include the group of spherosilicates known as silsesquioxanes. Silsequioxanes are polycyclic compounds formed from silicon and oxygen atoms with at least one silicon atom covalently linked to an organofunctional group. Silsesquioxanes can be fully or partially hydrolyzed. Fully hydrolyzed silsesquioxanes have the general formula $[RSiO_{1\frac{1}{2}}]_{2n}$, where R is an organofunctional group. The oxygen ratio is increased in partially hydrolyzed silsesquioxanes such as, for example, trisilanols, and tetrasilanols.

The organofunctional groups included with the siloxane oligomers of the present invention include any group that is compatible with subsequent coating compositions. For example, amino substituted silsesquioxanes are particularly compatible with subsequent epoxy and polyester coatings. Examples of organofunctional groups contemplated in the present invention include alkyl and alkoxy groups and at least one additional organofunctional group such as amino, ureido, epoxy, vinyl, cyanato, urethane, methacrylato, isocyanate, acrylato, sulfane, or mercapto functionalities. Organofunctional oligomers can also be formed from organofunctional silanes reacted with nonfunctional silanes.

The organofunctional siloxane oligomers for use in the present invention include commercially available fully hydrolyzed linear silsesquioxanes and partially hydrolyzed silsesquioxanes, such as for example, tetrasilanols and trisilanols. Examples of siloxane oligomers are aminosilsesquioxane, aminopropylsilsesquioxane oligomer, aminopropylsilsesquioxane-methylsilsesquioxane, which is a copolymer oligomer, and 3((2-aminoethyl)amino)propyl)silanetriol homopolymer. Additional commercially available siloxane oligomers, such as for example, aminopropylsilsesquioxane-vinylsilsesquioxane, are available for use in the present invention.

The organofunctional siloxane oligomers for use in the present invention should have a molecular weight in the range of about 250 to about 650. Preferably, the molecular weight of the organofunctional siloxane oligomers is less than about 500.

The aqueous solution of organofunctional siloxane oligomer is made by diluting the desired amount of organofunctional siloxane oligomer in deionized water and adjusting the pH with an acid or a base. Specifically, the organofunctional siloxane oligomer of the present invention is diluted in deionized water in a range of about 0.01 wt.-% to about 10 wt.-%. In one embodiment, the organofunctional siloxane oligomer is diluted in the aqueous solution in a range of about 0.02 wt.-% to about 2 wt.-%. In another embodiment, the organofunctional siloxane oligomer is diluted in the aqueous solution to about 0.05 wt.-% to about 1 wt.-%.

The pH of the aqueous solution should be slightly acidic to alkaline. The pH of the solution may be adjusted with any acid or base known in the art such as, for example, acetic acid or sodium hydroxide. The pH is preferably in a range from about 5 to about 12, and more preferably, from about 10 to about 12.

The aqueous solution of organofunctional siloxane oligomers can optionally include additional corrosion inhibitors. For example, zirconium, chromium, and zinc-phosphate based corrosion inhibitors may be dispersed in the aqueous solution as desired. These compounds should be added to the aqueous solution of organofunctional siloxane oligomers in quantities sufficient to inhibit corrosion of metal surfaces or promote passivation as is known in the art.

The aqueous solution of organofunctional siloxane oligomer of the present invention can be used to treat any metal surface that requires protection from corrosion. Examples of metal surfaces that can be utilized with this method include steel, stainless steel, cold rolled steel, galvanized steel, galvanneal, iron, aluminum, alloys of these metals, and others. The metal surface may optionally be treated with a standard corrosion inhibitor or passivation agent used in industry prior to application of the aqueous solution containing the organofunctional siloxane oligomer. The standard corrosion inhibitors or passivation agent should be applied to metal surfaces as known in the art. Examples of standard pretreatments for metals are zinc phosphate, iron phosphate, fluorotitanic acid, fluorozirconic acid and combinations thereof. Another example of a pretreated metal is anodized aluminum. Examples of passivation agents include silane-containing compounds such as, for example, bis-[triethoxysilyl]ethane.

To apply the coating of the present invention, the metal surface to be treated is first cleaned. The metal surface can be cleaned with any material known in the art such as, for example, an alkaline cleaner. The metal surface is then rinsed with water and allowed to dry.

The aqueous solution of organofunctional siloxane oligomers can be applied to the metal surface by any method known in the art that is used to apply a liquid to a surface such as, for example, dip coating, spraying, rolling, or brush application. The metal surface is exposed to the organofunctional siloxane oligomer for about 1 second to about 60 seconds, preferably for about 3 seconds to about 30 seconds. Generally the metal surface is exposed to organofunctional siloxane oligomer for about 5 seconds to about 10 seconds.

After coating with organofunctional siloxane oligomer, the metal surface is allowed to dry at room temperature. The surface can also be dried at an elevated temperature such as, for example, at about 100° C. for about 5 minutes.

After coating with the aqueous solution of organofunctional siloxane oligomer, a topcoat may be applied to the metal surface. The topcoat can be any coating known in the art that is used on metal. For example, the topcoat can be any organic solvent or water dispersed polymerizable coating composition including primers, pigment containing paints, as well as clear coats. In addition, powder coating techniques may be used. Exemplary topcoats include polyurethanes, acrylates or methacrylates, epoxies, or polyesters.

In a further embodiment, the organofunctional siloxane oligomer can be combined with an organofunctional silane. Suitable organofunctional silanes include amino silanes, vinyl silanes, bis-functional amino silanes, polysufide silanes, epoxy silanes, ureido silanes and isocyanato silanes, as well as mixtures thereof. Such silanes are disclosed in U.S. Pat. No. 6,416,869; U.S. Pat. No. 6,756,079; PCT application WOP2004/009717; pending application U.S. 2005/0058843; and U.S. Pat. No. 6,919,469, the disclosures of which are hereby incorporated by reference.

Suitable monofunctional silanes include: vinylethoxysilane, gamma-methacryloxypropyltrrimethoxysilane, gamma-glycidoxypropyltrimethoxysilane, gamma-ureidopropyltrimethoxysilane and gamma-isocyanatopropyltriethoxysilane.

In addition to using straight monomeric silanes, a mixture of monomeric silanes can be employed, in particular, a blend of aminosilane in combination with vinyl silane has been found to be particularly advantageous. A ratio of 5:1 volume/volume of bis-aminosilane and vinyl silane is particularly beneficial, as is discussed below.

Bis-silyl aminosilanes which may be employed in the present invention have two trisubstituted silyl groups, wherein the substituents are individually chosen from the group consisting of alkoxy, aryloxy and acyloxy.

The ratio of organofunctional silane to oligomer can vary from 10:1 to 1:10 by volume.

The present invention will be further appreciated in light of the following detailed examples.

Example 1

The following metal pretreatments were tested as a replacement for conventional iron phosphates and its corresponding sealers. Conventional metal surface anti-corrosion pretreatment require a step in which the corrosion inhibitor is sealed. An additional benefit with organofunctional siloxane oligomer pretreatments is that the conventional sealing step is omitted.

Solutions preparation: Aqueous solutions of organofunctional siloxane oligomers were prepared by adding 2 volume parts of the following individual chemicals into 95 volume parts of de-ionized water (hereinafter "DI water"). 3 volume parts of 1 N sodium hydroxide solution were added into the above solution for pH adjustment. The final pH was 11.

The organofunctional siloxane oligomer used in these examples include: methoxy terminated aminosilsesquioxanes (hereinafter "Z-6184", available from Dow Corning in >60 wt.-% solution), 3-((2-aminoethyl)amino)propyl)silanetriol homopolymer (hereinafter "Z-6137", available from Dow Corning in a 15 wt.-% to 40 wt.-% solution), aminopropylsilsesquioxane-methylsilsequioxane copolymer oligomer, (hereinafter "AMME", available from Gelest Inc. in a 22 wt.-% to 25 wt.-% solution) and aminopropylsilsesquioxane oligomer (hereinafter "AM", available from Gelest Inc. in a 22 wt.-% to 25 wt.-% solution).

The practical usage level of the above solutions is normally below 2 wt.-%. Therefore, the final concentration was obtained simply by dilution of the above 2 wt.-% solutions.

Substrate: Cold rolled steel panels (hereinafter "CRS", from ACT Laboratories) were cleaned with a 7 wt.-% Chemclean (purchased from Chemetall/Oakite Inc) at 60° C., followed by tap water rinsing and blow air drying.

Application and drying: The cleaned CRS panels were immersed into the aqueous solutions of organofunctional siloxane oligomers with the concentrations of 0.5 wt.-%, 0.25 wt.-%, 0.1 wt.-% and 0.05 wt.-% for 5 to 10 seconds, followed by 100° C. drying for 5 minutes.

Topcoats: Two Morton® powder coatings, (1) Corvel sky white, polyester; and (2) epoxy black (available from Rohm & Haas), were applied onto the organofunctional siloxane oligomer pretreated CRS panels.

Test: Powder painted CRS panels were then scribed and were exposed to salt spray test (hereinafter "SST") according to ASTM B117. The creepages of the coatings were examined periodically.

Results: Table 1 displays a 500-hr SST result for polyester powder painted CRS panels with different pretreatments and epoxy-powder painted CRS panels after SST. It is clearly seen in Table 1 that organofunctional siloxane oligomer pretreatments perform very well without sealer. The organofunctional siloxane oligomer pretreatment after 400 hrs in SST even outperforms the control which utilize commercial iron phosphate pretreatment followed by a non-chrome sealer after only 250 hrs in SST. The nonpretreated control showed complete delamination (Del) after 500 hours in SST.

TABLE 1

| Pretreatment | 100 hr | 190 hr | 300 hr | 450 hr | 500 hr |
|---|---|---|---|---|---|
| 0.5 wt.-% AM | <0.5 | 1 | 2 | 3 | 3.5 |
| 0.25 wt.-% AM | <0.5 | 0.75 | 1.5 | 3 | 3.5 |
| 0.2 wt.-% AM | <0.5 | 0.75 | 1.5 | 3.5 | 3.5 |
| 0.1 wt.-% AM | <0.5 | 0.5 | <1.5 | 2.5 | 2.5 |
| 0.05 wt.-% AM | <0.5 | 0.5 | <1.5 | 3 | 3 |
| 0.5 wt.-% AMME | 0 | 0 | <1.5 | <2 | 2 |
| 0.25 wt.-% AMME | 0 | <0.5 | <1.5 | 1.5 | 2 |
| 0.2 wt.-% AMME | <0.5 | 0.5 | 1 | 2.5 | 2.5 |
| 0.1 wt.-% AMME | <0.5 | <0.5 | <1.5 | 3.5 | 3.5 |
| 0.05 wt.-% AMME | 0.5 | 1 | 2 | 3.5 | 3 |
| 0.5 wt.-% Z-6184 | 1 | 1.5 | 2 | 4 | 4 |
| 0.25 wt.-% Z-6184 | <1 | 1 | 2.5 | 3.5 | 4.5 |
| 0.2 wt.-% Z-6184 | <1 | <1.5 | 2.5 | 3.5 | 4.5 |
| 0.1 wt.-% Z-6184 | 0.5 | <1 | 2.5 | 3.5 | 3.5 |
| 0.05 wt.-% Z-6184 | 0.5 | <0.5 | 2 | 2 | 3.5 |

Example 2

The following metal pretreatments were tested as a replacement for conventional hexavalent chromium pretreatment in the coil industry.

Solutions preparation: Aqueous solutions of organofunctional siloxane oligomers were prepared by adding 2 volume parts of the following individual chemicals into 95 volume parts of DI water. The solution pH was adjusted by the addition of 3 parts acetic acid. The final pH was 6.

The organofunctional siloxane oligomers used in this example include: Z-6184, Z-6137, AMME, and AM.

The practical usage level of the above solutions is normally below 2 wt.-%. Therefore, the final concentration was obtained simply by dilution of the above 2 wt.-% solutions.

Substrate: Hot-dip galvanized steel panels (hereinafter "HDG", from PPG Industries) were cleaned with a 7 wt.-% Chemclean (purchased from Chemetall/Oakite Inc) at 65° C., followed by tap water rinsing and blow air drying.

Application and drying: The cleaned HDG panels were immersed into the above organofunctional siloxane oligomer solutions with the concentration of 0.5 wt.-% for 5 to 10 seconds, followed by 100° C. drying for 5 minutes.

Primers: Two chromate-containing solvent-borne primers (from PPG), 1 PLY 5823 and 1 PLY 5440, were applied onto the above treated HDG panels with a #30 draw down bar. The curing condition was 150° C. for 5 minutes. The dry film thickness was around 15 microns.

Topcoat: A solventborne polyester topcoat (Polydure® 5000 Torres Blue S/G), was drawn down onto the above primed HDG panels with a #30 draw down bar. The curing condition was 150° C. for 20 minutes. The dry film thickness was around 15 microns.

Test: Polyester topcoated HDG panel surfaces were then scribed and were exposed to SST according to ASTM B117. The creepages of the coatings were examined periodically.

Results: Table 2 displays a 500-hr SST result for polyester painted HDG with different pretreatments. In Table 2, AM and Z-6184 show the best results, i.e., no creepage, after 500 hrs in SST.

TABLE 2

| Pretreatment | Primer | Creepage (mm) |
|---|---|---|
| AM (0.5 wt.-%) | 1 PLY 5440 | 0 |
| AMME (0.5 wt.-%) | 1 PLY 5440 | 0.5 |
| Z-6137 (0.5 wt.-%) | 1 PLY 5440 | 1 |
| Z-6184 (0.2 wt.-%) | 1 PLY 5440 | 0 |
| AM (0.5 wt.-%) | 1 PLY 5823 | NA |
| AMME (0.5 wt.-%) | 1 PLY 5823 | 0.5 |
| Z-6137 (0.5 wt.-%) | 1 PLY 5823 | Del |
| Z-6184 (0.2 wt.-%) | 1 PLY 5823 | 1 |
| NONE | 1 PLY 5823 | Del |

Example 3

The following metal pretreatments were tested as a replacement for conventional zinc phosphate based pretreatment that is used in the automotive industry.

Solutions preparation: An aqueous solution of organofunctional siloxane oligomer was prepared by adding 1 volume parts of the following individual chemicals into 99 volume parts of DI water.

AMME is the organofunctional siloxane oligomer used in this example.

Substrate: Sand-blasted high-strength carbon steel coils were cleaned with a 7 wt.-% Chemclean (purchased from Chemetall/Oakite Inc) at 65° C., followed by tap water rinsing and blow air drying.

Application and drying: The AMME solution was spray-applied onto the cleaned steel coils, followed by 100° C. drying for 5 minutes.

Topcoat: An epoxy powder was applied onto the above steel.

Test: The epoxy powder painted steel coil surfaces were then scribed and were exposed to GM 9505P Environmental Cycle J-5 cycles.

Results: Table 3 displays the test results for epoxy powder painted carbon steel coils after GM 9505 Environmental Cycle J-5 cycles. It is clear in Table 3 that AMME pretreatment performed equally well as a conventional zinc phosphating process. This indicates that organofunctional siloxane oligomer pretreatments have a potential to be a viable replacement of pretreatment of metal surfaces with Zinc phosphate.

TABLE 3

| Pretreatment | Creepage (mm) |
|---|---|
| AMME, 1 wt.-% | 7.8 |
| Zn-phosphate | 8.4 |
| Alkaline-cleaned only | 18.4 |

Example 4

The following metal treatments were tested as sealers or post rinses of metal surfaces having a zirconium-based treatments as used in general industry.

Solutions preparation: Aqueous solutions of organofunctional siloxane oligomers were prepared by adding 2 volume parts of the following individual chemicals into 95 volume parts of DI water. 3 volume parts of 1 N sodium hydroxide solution were added into the above solution for pH adjustment. The final pH was 11.

The organofunctional siloxane oligomers used in this example include: AMME and AM.

The practical usage level of the above solutions is normally below 2 wt.-%. Therefore, the final concentration was obtained simply by dilution of the above 2 wt.-% solutions.

Substrate: Zirconium treated cold-rolled steel (hereinafter "CRS").

Application and drying: The zirconium treated CRS panels were immersed in the above organofunctional siloxane oligomer solutions at different concentrations, ranging from 0.01 wt.-% to 0.25 wt.-% by volume for 5 to 10 seconds, followed by 100° C. drying for 5 minutes.

Topcoat: A solvent borne polyester topcoat was drawn down onto the above treated CRS panels with a #50 draw down bar. The curing condition was 160° C. for 20 minutes. The dry film thickness was around 35 microns.

Test: Polyester topcoated CRS panel surfaces were then cross cut and were exposed to a salt spray test (SST) according to ASTM B117. The creeps of the coatings from the scribes were examined after 120 hrs in SST.

Results: Table 4 displays a 120-hr SST result for polyester painted CRS with different organofunctional siloxane oligomer sealers. It is clearly seen in table 4 that the zirconium-treated CRS panels show better performance (i.e., smaller creeps) after organofunctional siloxane oligomer post-rinsing than the panel without any organofunctional siloxane oligomer post rinses.

TABLE 4

| Pretreatment | Creepage (mm) |
|---|---|
| AMME (0.25 wt.-%) | 2.8 |
| AMME (0.1 wt.-%) | 8 |
| AMME (0.05 wt.-%) | 10 |
| AMME (0.01 wt.-%) | 9 |

TABLE 4-continued

| Pretreatment | Creepage (mm) |
| --- | --- |
| AM (0.25 wt.-%) | 2.8 |
| AM (0.1 wt.-%) | 3.1 |
| AM (0.05 wt.-%) | 7.5 |
| AM (0.01 wt.-%) | >15 |
| Zr treatment ONLY | >15 |

Example 5

The following metal pretreatments were tested as sealers or post rinses for conventional iron phosphating used in general industry.

Solutions preparation: Aqueous solutions of organofunctional siloxane oligomers were prepared by adding 2 volume parts of the following individual chemicals into 95 volume parts of DI water. The solution pH was adjusted by sodium hydroxide. The final pH was 11.

The organofunctional siloxane oligomers used in this example included AMME and AM.

The practical usage level of the above solutions is normally below 2 wt.-%. Therefore, the final concentration was obtained simply by dilution of the above 2 wt.-% solutions.

Substrate: Iron phosphate treated cold-rolled steel (CRS).

Application and drying: The iron phosphated CRS panels were immersed in the above organofunctional siloxane oligomer solutions at different concentrations, ranging from 0.01 wt.-% to 0.25 wt.-% for 5 to 10 seconds, followed by 100° C. drying for 5 minutes.

Topcoat: An epoxy-polyester hybrid powder paint was applied onto the above treated CRS panels. The curing condition was 177° C. for 15 minutes. The dry film thickness was around 50 microns.

Test: Powder painted CRS panels were then cross cut and were exposed to a salt spray test (SST) according to ASTM B117. The creepage of the coatings from the scribes was examined after 230 hrs in SST.

Results: Table 5 displays a 230-hr SST result for polyester painted CRS with different organofunctional siloxane oligomer sealers. It is clearly seen in Table 5 that the organofunctional siloxane oligomer post rinses at certain concentrations enhance the coating performance of the organofunctional siloxane oligomer rinsed panels as compared to the panel without organofunctional siloxane oligomer post rinsing.

TABLE 5

| Pretreatment | Creepage (mm) |
| --- | --- |
| AMME (0.25 wt.-%) | 2 |
| AMME (0.1 wt.-%) | 3.5 |
| AMME (0.05 wt.-%) | 5 |
| AMME (0.01 wt.-%) | 7 |
| AM (0.25 wt.-%) | 2 |
| AM (0.1 wt.-%) | 2.5 |
| AM (0.05 wt.-%) | 6.5 |
| AM (0.01 wt.-%) | 6 |
| Fe PO$_4$ treatment ONLY | 7 |

Example 6

The following metal pretreatments were tested as passivation treatments of hot dip galvanized steel ("HDG") for white rust prevention in coil industry.

Solutions preparation: Mixed solutions of AMME and bis-[triethoxysilyl]ethane (hereinafter "BTSE", available from GE Silicones) were prepared by adding 5 wt.-% AMME solution into 5 wt.-% BTSE aqueous solution at different volume rations (see Table 6).

Substrate: Bare hot dip galvanized steel (from CORUS).

Application and drying: The HDG panels were immersed into the above mixed solutions for 5 to 10 sec, followed by 100° C. drying for 30 min.

Test: 3.5 wt.-% NaCl neutral salt immersion test was conducted on the above treated HDG panels. The exposure time was 4 days.

Results: Table 6 displays a 4-day salt immersion test result for the treated HDG panels. It is clearly seen in Table 6 that HDG panels treated with the system of BTSE/AMME (5 wt.-%, 3/1) show the best corrosion prevention performance (i.e., no white rust) after 4 days of immersion in a 3.5 wt.-% NaCl solution.

TABLE 6

| BTSE:AMME | HDG surface appearance after 4 days of salt immersion |
| --- | --- |
| BTSE-only | A little white rust at the edges and along the water line |
| 9:1 | A little white rust at the edges and along the water line |
| 7:1 | Slight white rust at the edges and along the water line |
| 5:1 | Slight white rust at the edges and along the water line |
| 3:1 | No white rust |
| 1:1 | Slight white rust at the edges and along the water line |
| 1:3 | Slight white rust at the edges and along the water line |
| 1:5 | Considerable amount of white rust along the water line |
| 1:7 | Considerable amount of white rust along the water line |
| 1:9 | Considerable amount of white rust along the water line |
| AMME-only | Heavy white rust at the edges and along the water line |

As shown, a 3:1 volume ratio of BTSE to AMME performed best.

As shown in the above examples and general description, the present invention provide the advantage of offering greater protection to metal surfaces from corrosion than conventional corrosion inhibitors. In addition, the organofunctional siloxane oligomers are in an aqueous solution, reducing the amount of solvents used in the metal coating process.

This has been a description of the present invention along with the preferred method of practicing the present invention. However, the invention itself should only be defined by the appended claims, wherein we claim:

We claim:

1. A method of providing corrosion protection and passivation to a metal surface comprising:
   applying an aqueous solution to said metal surface, said aqueous solution consisting of 0.05 wt.-% to 1.0 wt.-% of an organofunctional siloxane oligomer and optionally one or more of an acid, a base, and a silane,
   wherein said metal surface is selected from the group consisting of steel, stainless steel, cold rolled steel, galvanized steel, galvanneal, iron, aluminum, anodized aluminum, and alloys thereof, and said organofunctional siloxane oligomer is selected from the group consisting of aminopropylsilsesquioxane, aminopropylsilsesquioxane-methylsilsesquioxane copolymer, aminopropyl-silsesquioxane-vinylsilsesquioxane copolymer, and combinations thereof.

* * * * *